United States Patent [19]

Goebel et al.

[11] Patent Number: 4,731,305

[45] Date of Patent: Mar. 15, 1988

[54] CYLINDRICAL BIPOLAR ELECTRODE BATTERY

[75] Inventors: Franz Goebel, Sudbury; David C. Batson, Amesbury; Anthony J. Miserendino, Acton; Gerard Boyle, Concord, all of Mass.

[73] Assignee: GTE Government Systems Corporation, Waltham, Mass.

[21] Appl. No.: 50,122

[22] Filed: May 15, 1987

[51] Int. Cl.[4] .............................................. H01M 6/48
[52] U.S. Cl. ...................................... 429/94; 429/110; 429/210; 429/72
[58] Field of Search .................. 429/94, 121, 122, 110, 429/116, 210, 72

[56] References Cited

U.S. PATENT DOCUMENTS

| 4,161,063 | 7/1979 | Goebel et al. | 29/623.5 |
| 4,376,811 | 3/1983 | Goebel | 429/101 |
| 4,517,736 | 5/1985 | Goebel | 29/623.2 |
| 4,535,038 | 8/1985 | Boyle et al. | 429/156 |
| 4,684,588 | 8/1987 | Goebel et al. | 429/94 X |

FOREIGN PATENT DOCUMENTS 2856772  11/1979  Fed. Rep. of Germany .

Primary Examiner—Anthony Skapars
Attorney, Agent, or Firm—J. Stephen Yeo

[57] ABSTRACT

A battery has first and second polarity circular electrodes within a circular housing. At least one bipolar electrode is interposed between the first and second polarity circular electrodes. Porous separators are located between electrodes. The cell also includes an electrolyte solution. Electric current is coupled from the first and second cylindrical electrodes.

2 Claims, 5 Drawing Figures

CYLINDRICAL BIPOLAR ELECTRODE BATTERY

RELATED COPENDING APPLICATION

Ser. No. 07/050,121 Battery Component is concerned with the grooved and channeled disc usable in the battery of the present application.

BACKGROUND OF THE INVENTION

This invention pertains to electrochemical cells and more particularly is concerned with liquid cathode cells.

Primary electrochemical cells are utilized for a wide variety of applications and are commonly available in a large assortment of sizes and shapes, including cylindrical. A cylindrical cell is disclosed in U.S. Pat. No. 4,376,811 in the name of Franz Goebel and includes a lithium anode, a carbon cathode current collector structure, and a porous separator interposed between the lithium anode and the carbon cathode current collector structure.

The carbon cathode current collector structure is physically pressed against the interior wall of a metal housing and is arranged concentrically within the housing with the separator and lithium anode. The assembly of the lithium anode, carbon cathode current collector structure and separator is exposed to an electrolytic solution including a reducible liquid cathode solvent and an electrolyte solute dissolved in the reducible cathode solvent. Suitable materials for the reducible cathode solvent and the electrolyte solute are thionyl chloride and lithium tetrachloroaluminate, respectively.

In the normal discharge of such a cell, the reducible cathode solvent is catalytically reduced at the surface of the carbon cathode current collector structure. This catalytic reduction results in the formation of a variety of reaction products within the cell and physically consumes available carbon sites, thionyl chloride and lithium until one of these components is depleted. The life span of the cell is to a large degree dictated by the amount of lithium and thionyl chloride initially present in the cell and the rate at which the thionyl chloride and lithium are depleted by electrochemical action with the cell.

A further, and undesirable, reduction of the thionyl chloride also takes place at those metallic portions and surfaces of the cell at the same electrical potential as the lithium anode. This latter reduction of the thionyl chloride, which may take place during storage of the cell prior to normal discharge of the cell, is a parasitic self-discharge reaction and can lead to an undesirable capacity loss and a premature termination of the rated life span of the cell.

To prevent parasitic discharge, it is known to keep the electrolyte separate from the other cell components during storage and until activation. Cells having this feature are known as reserve cells. In one arrangement, a glass ampule containing a ready-to-use electrolyte is centrally located within the cell.

As is well known, a battery includes a plurality of cells arranged in series to provide a voltage greater than that possible from a single cell alone.

Furthermore, it is known that the anode and cathode current collector structure of adjacent cells may be on opposite sides of a conductive carrier plate or substrate. The assembly is called a bipolar plate. Batteries have been made with a multiplicity of flat bipolar plates arranged in a linear stack with the end of the stack terminated by plates carrying at the other end, an anode at one end and a cathode current collector structure. An insulating separator made of a thin porous material such as glass paper is interposed between facing anode and cathode current collector structures. A quantity of electrolyte solution is carried between the plates. The elements and electrolyte between adjacent carrier form a cell. Adjacent cells are connected in a series through the carrier plates.

To prevent short circuits between cells, it is important that the various plates be electrically insulated from each other, and that there is no communication of electrolyte solution directly between cells. At the same time, the plates must be mechanically supported in their relative positions during normal and shock conditions.

SUMMARY OF THE INVENTION

Briefly, a battery has first and second polarity circular electrodes within a circular housing. At least one bipolar electrode is interposed between the first and second polarity circular electrodes. Porous separators are located between electrodes. The cell also includes an electrolyte solution. Electric current is coupled from the first and second cylindrical electrodes.

DETAILED DESCRIPTION OF THE INVENTION

Figure 1:
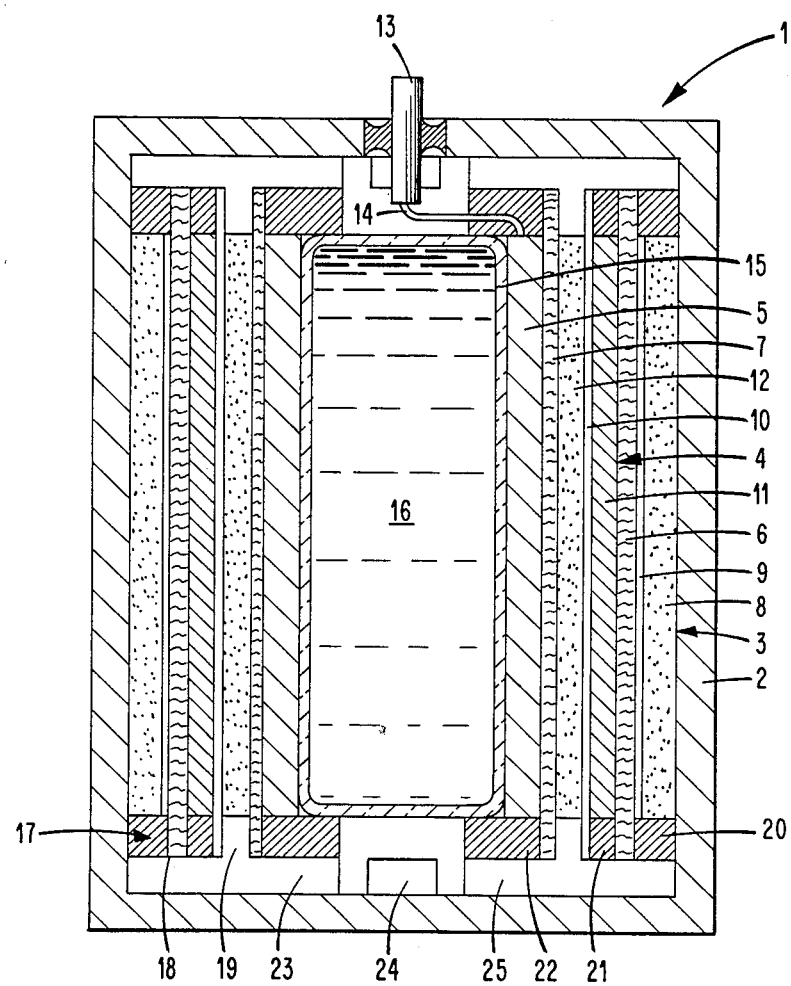
FIG. 1 is a cross-sectional view of a battery embodying the invention.

Referring to FIG. 1, there is shown in cross-section, a reserve type electrochemical cell 1 embodying the present invention.

In the embodiment shown, cell 1 has an elongated cylindrical metal housing 2 preferably made of stainless steel, nickel or other conductive material resistance to electrolyte solution. Disposed within the housing 2 is a concentric cylindrical arrangement of a cylindrical cathode current collector structure 3, at least one cylindrical bipolar electrode structure 4, and an anode cylindrical structure 5. A thin porous separator 6, 7 is interposed between each electrode structure. The arrangement of these electrode structures 3, 4, 5, and separators 6, 7 is collectively referred to as a battery stack.

Figure 2:
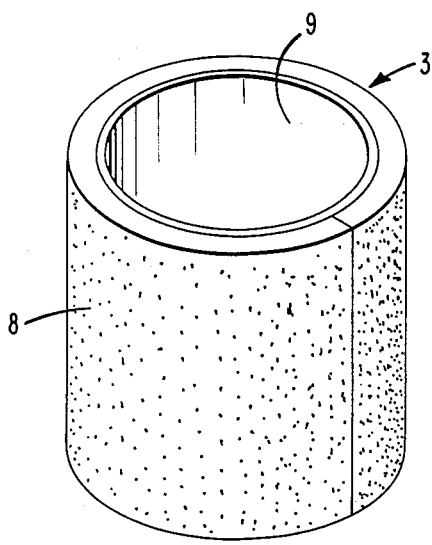
FIG. 2 is a view of a cylindrical cathode current collector structure used in the battery.

The aforementioned cathode current collector structure 3 is seen separately in FIG. 2 and preferably includes a porous carbon element 8 in the form of a thin elongated cylindrical sheet, and a support sheet 9 of glass paper or other inert porous material.

The porous carbon element 8 may be produced by compressing an aggregation of discrete semi-tight porous carbon conglomerates on one side of sheet 9. The conglomerates of the element as described hereinabove generally contain a combination of carbon black, graphite, and a binder such as polytetrafluorethylene. By virtue of the porous nature of the above ingredients when compressed together, a network of electrolyte-conducting channels are established throughout the carbon element whereby the carbon element can be permeated by electrolytic solution. Techniques for producing the conglomerates employed by carbon element 8 are described in detail in U.S. Pat. No. 4,161,063 to which reference may be made for specific details.

As seen in FIG. 1, cathode current collector structure 3 physically abuts the interior wall of housing 2, so that the porous carbon element 8 forms an electrical connection therewith establishing the housing 2 as the positive terminal of the cell. The glass paper support 9 faces inwards toward a bipolar electrode structure 4.

Figure 3:
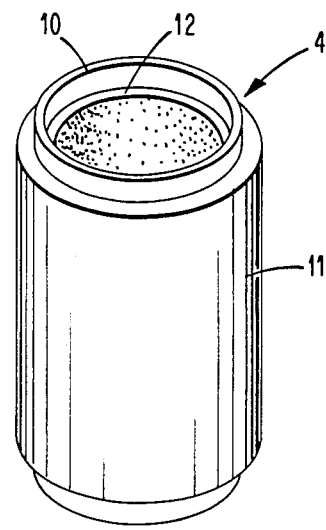
FIG. 3 is a view of a cylindrical bipolar electrode structure used in the battery.

Referring briefly to FIG. 3, each bipolar electrode structure 4 includes a cylindrical conductive carrier 10 which carries on one side an anode layer 11 and on the other side a catalytic layer 12. The carrier 10 may be stainless steel, nickel, or like conductive inert material. The anode layer 11 may be made of lithium metal; and the catalytic layer 12 may be made of porous carbon. Ends of the carrier 10 are joined to prevent electrolyte leakage.

Turning again to FIG. 1, porous separator 6 is disposed intermediate to the cathode current collector structure 3 and the facing anode layer 11 of cylindrical bipolar structure 4. Separator 6 spaced the cathode current collector structure 3 from the bipolar structure 4 and distributes electrolyte solution. Separator 6 typically takes the form of a cylindrical sheet of a standard, electrically non-conductive material such as glass paper.

The innermost electrode structure is anode structure 5 which is preferably a solid elongated cylindrical sheet of an oxidizable active alkali metal such as lithium. Porous separator 7 is disposed intermediate to the anode structure 5 and the facing catalytic layer 12 of bipolar structure 4.

An insulated feedthrough member 13 is coupled to anode structure 5 by welded conductor 14 and functions as the negative terminal of the battery. In the discribed embodiment the housing, which is in contact with the cathode current collector structure 3, functions as the positive terminal of the battery.

It will be apparent to those skilled in the art that the arrangement can be reversed with the anode structure on the outside, the bipolar structure reversed, and the cathode current collector structure inside the stack with a corresponding reversal of polarity.

Furthermore, a plurality of concentric bipolar structures may be used. They are oriented with the anode layers aligned in the same direction, so that the anode layer of one plate faces the catalytic element of the adjacent bipolar structure or the cathode current collector 3 as the case may be.

The elements between adjacent carrier plates form an electrochemical cell. Contiguous cells are electrically connected in series through the conductive carrier plates, forming a battery.

Container 15 is surrounded by the innermost electrode structure and contains a quantity of electrolyte solution 16 or electrolyte component. A suitable and preferred electrolytic solution is a cathode electrolyte solution including a reducible liquid cathode solvent, such as thionyl chloride, and an electrolyte solute, such as lithium tetrachloroaluminate, dissolved in the thionyl chloride to make a 1.8 mol solution.

The container 15 is made of an electrically non-conductive material which may be pierced or broken to release its contents and activate the cell 1. As seen in the drawing, the container 15 is preferably a glass ampule centrally located within the housing 2.

The container 15 maybe broken by pressure upon the housing end. The solution then permeates the porous carbon structures and the porous separators.

It is important that there is no direct communication of electrolyte solution between cells. Electrolyte leakage between cells causes parasitic shorts which diminish the capacity of the battery. For this reason, provision must be made to seal the edges of the carrier plates while still allowing passage of the electrolyte from the container 15.

Figure 4:
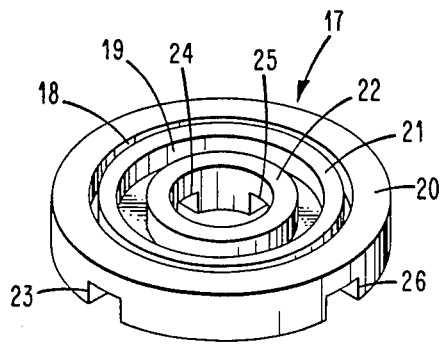
FIG. 4 represents a grooved disc used to seal the edges of the battery structures.
Figure 5:
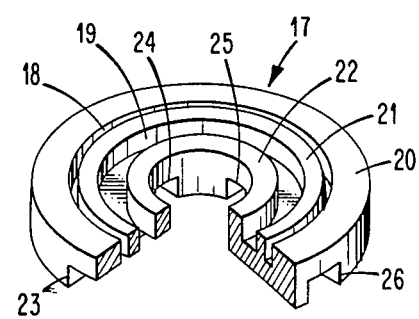
FIG. 5 is a view of the disc with a three-eights section removed.

A disc 17 is provided at least one end of the battery. Disc 17 is shown separately in FIG. 4 while FIG. 5 shows the disc with a three-eighths section removed. Disc 17 has circular grooves 18, 19 in one flat side which are dimensioned to accept the edges of the separators 6, 7 which extend beyond the edges of the active parts of electrode structures 3, 4, 5. Substrate 10 of bipolar structure 4 may also extend into a groove to help prevent electrolyte leakage between cells. If there is only one bipolar structure, there are two grooves; if there are n bipolar structures, there are n+1 grooves, one for each separator in the battery. The electrode structures contact circular ridges 20, 21, 22 which prevent lateral movement. The disc is preferably made of inert plastic.

Radial channels 23, 24, 25 and 26 are provided in the flat side disc opposite the circular grooves. Where the grooves and channels cross, there if fluid communication. This allows electrolyte solution to flow from container through the channels 23, 24, 25, 26 to the grooves 18, 19 where it is transported by capillary action throughout the separators 6, 7 thereby wetting the contiguous electrode structures and activating the cell.

EXAMPLE

A two-cell battery was constructed following the above teachings, but without the grooved discs or container. The housing has an inside diameter of 0.480 inches and a height of 0.825 inches. The cylinder cathode current collector structure was 15 mil thick porous carbon on glass paper. The cylinder anode structure was 6 mil lithium. One cylindrical bipolar structure was used, having a carrier made of 2 mil thick type 304 stainless steel. The separators were made of 2 mil porous polymer. The active interelectrode surface area was 4 $cm^2$. A 1.8 mol solution of lithium tetrachloroaluminate in thionyl chloride was added by syringe. The initial open circuit voltage was 7.0 volts but dropped to about 5.7 volts, possibly due to electrolyte leakage between cells. The battery was able to produce over 5.5 volts for over ten minutes at a discharge rate of 6.4 mA/$cm^2$, about twice the power output and voltage capability of a single cell.

The preferred embodiment and best mode of practicing the invention has been disclosed. It will be apparent to others skilled in the art that various modifications can be made within the bounds of the invention as hereinafter claimed.

What is claimed is:
1. A battery comprising
    (a) cylindrical housing;
    (b) concentrically arranged cylindrical electrode structures within said cylindrical housing including:
        (i) a first polarity cylindrical electrode structure

(ii) a second polarity cylindrical electrode structure; and (iii) at least one bipolar cylindrical electrode structure having a conductive carrier, a first polarity electrode layer on the side of the carrier facing said second polarity cylindrical electrode structure, and a second polarity electrode layer on the side of the carrier facing said first polarity cylindrical electrode structure;

(c) a porous separator between each cylindrical electrode structure;

(d) a quantity of electrolyte solution; and (e) means to couple electrical current from said first polarity and second polarity cylindrical electrode structures.

2. The battery of claim 1 which further includes a container for storing said electrolyte solution; and a disc having circular grooves accepting edges of said separators and at least one channel providing fluid communication between said container and said grooves.

* * * * *